July 15, 1958

H. F. STREIB 2,843,338

CIRCULAR WING AIRCRAFT HAVING PRESSURE INDUCED RADIAL AIRFLOW

Filed April 28, 1955

*INVENTOR.*
HOMER F. STREIB

BY

*Knox & Knox*

ATTORNEYS

July 15, 1958

H. F. STREIB 2,843,338

CIRCULAR WING AIRCRAFT HAVING PRESSURE INDUCED RADIAL AIRFLOW

Filed April 28, 1955

INVENTOR.
HOMER F. STREIB
BY
Knox & Knox
ATTORNEYS

United States Patent Office 2,843,338
Patented July 15, 1958

2,843,338

CIRCULAR WING AIRCRAFT HAVING PRESSURE INDUCED RADIAL AIRFLOW

Homer F. Streib, Chula Vista, Calif.

Application April 28, 1955, Serial No. 504,625

8 Claims. (Cl. 244—12)

The present invention relates generally to aircraft and more particularly to a circular wing aircraft having pressure induced radial airflow.

The primary object of this invention is to provide a circular wing aircraft having a centrally mounted, downwardly thrusting impeller which draws air radially inwardly across the wing, the radial cross section of the wing being a true airfoil, there being provided means for inducing the radial flow by a directed flow of pressurized air.

Another object of this invention is to provide a circular wing aircraft in which the impeller is mounted in a gimbal and is controllably tiltable to deflect the airflow for directional control of the aircraft.

Another object of this invention is to provide an aircraft which can take off and land vertically fly in any direction horizontally and, with auxiliary power is capable of reasonably high speed forward flight.

Finally, it is an object to provide a circular wing aircraft of the aforementioned character which is simple, safe and convenient to operate, and which can be built using existing materials and construction methods.

With these and other objects definitely in view, this invention consists in the novel construction, combination and arrangement of elements and portions, as will be hereinafter fully described in the specifications, particularly pointed out in the claims, and illustrated in the drawings which form a material part of this disclosure and wherein similar characters of reference indicate similar or identical elements and portions throughout the specification and throughout the views of the drawings, and in which:

Figure 1:
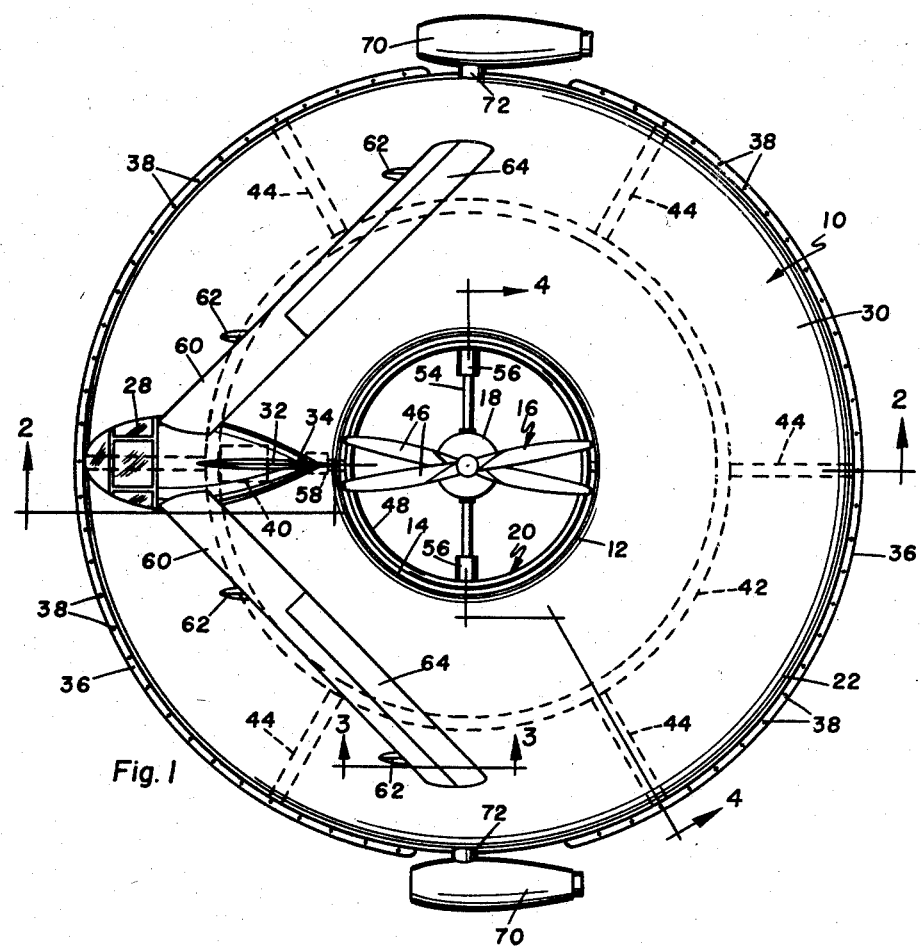
Fig. 1 is a top plan view of the aircraft.
Figure 2:
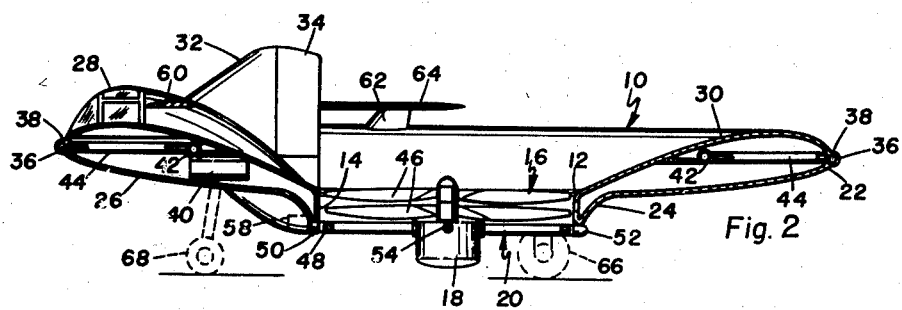
Fig. 2 is a sectional view taken on the line 2—2 of Fig. 1.
Figure 3:
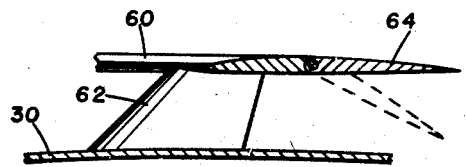
Fig. 3 is an enlarged fragmentary sectional view taken on the line 3—3 of Fig. 1.
Figure 4:
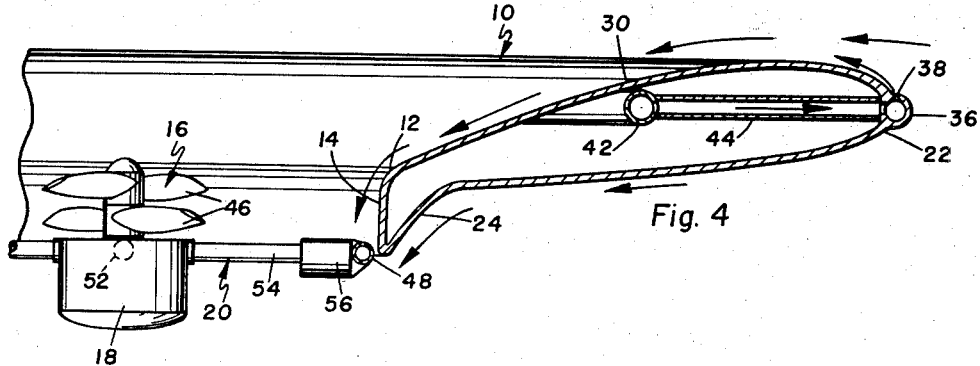
Fig. 4 is an enlarged fragmentary sectional view taken on the line 4—4 of Fig. 1.

The aircraft comprises a circular wing 10 having a central circular opening 12, with a short duct 14 extending downwardly from said opening. Mounted in the duct 14 is an impeller 16 driven by a suitable motor 18, the motor being supported on a gimbal 20 so that the impeller is tiltable. The radial cross section of the wing from the opening 14 to the outer periphery 22 is a true airfoil, with the leading edge thereof at said periphery as shown in Figs. 2 and 4. The lower surface 26 of the wing 10 is smoothly faired into the duct 14 by a fairing 24. At the forward end of the aircraft is a cabin enclosure 28 projecting above the upper surface 30 of the wing, and extending upwardly from the rear of said cabin is a fixed fin 32 on which is mounted a rudder 34. Surrounding the periphery 22 is a tubular induction ring 36 having a plurality of upwardly and inwardly directed apertures 38 therein to direct jets of air over the upper surface 30, as shown by directional arrows in Fig. 4. Pressurized air is supplied to the induction ring 36 by a compressor 40 through a distributor ring 42, which is connected to said induction ring by radial pipes 44. Other distribution systems may be used if desired to provide an evenly distributed pressurized air supply to the induction ring 36.

The impeller 16 is illustrated as comprising a pair of propellers 46 which are contra-rotating to eliminate torque, although any suitable impeller may be used. The duct 14 serves as a shroud to increase the efficiency of the impeller and reduce tip losses. The gimbal 20 includes a gimbal ring 48 which is pivotally mounted on the longitudinal axis of the aircraft on a front bearing 50 and a rear bearing 52 fixed to the lower edge of the duct 14. The motor 18 is pivotally mounted within the gimbal ring 48 on a cross shaft 54 at right angles to the axis of the front and rear bearings 50 and 52. Thus the motor 18 together with the impeller 16 is tiltable about two axes normal to each other. Operatively connected to the outer ends of the shaft 54 are synchronized actuating motors 56 for tilting the impeller 16 about that axis, while at the front bearing 50 is a further actuating motor 58 for tilting the assembly about the longitudinal axis.

Figure 5:
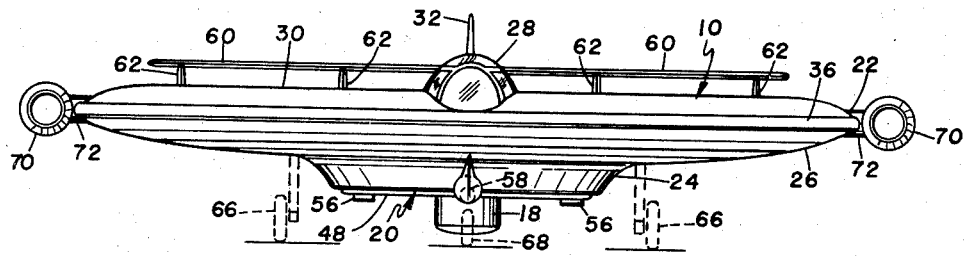
Fig. 5 is a front elevation view of the aircraft.

Mounted above the upper surface 30 are opposed control planes 60 which extend from the cabin 28 outwardly and rearwardly across the wing 10 and are supported on streamlined struts 62. Pivotally mounted on the control planes 60 are elevons 64 which are pilot actuated by conventional flying controls. The aircraft is fitted with a suitable landing gear, such as the well known tricycle type shown in dash line in Figs. 2 and 5, which includes main wheels 66 and a nose wheel 68.

For auxiliary power, particularly for high speed forward flight, the aircraft may be fitted with jet engines 70 such as turbojets, ram jets, or the like. The jet engines 70 are shown mounted diametrically opposite each other on the periphery 22 on an axis parallel to the shaft 54, the actual location not being critical, however. For added versatility, the jet engines 70 can be pivotally mounted on arms 72 extending from the periphery 22, so that the thrust can be directed upwardly or downwardly to provide additional directional control.

In operation, the impeller 16 creates a downwardly moving column of air through the duct 14 which causes air to be drawn radially inwardly across the upper surface 30 of the wing 10, as shown by the directional arrows in Fig. 4. The airstream issuing from the lower end of the duct 14 also causes an inward flow over the bottom surface 26 due to induction at the edge of the duct, the effect being well known. It has been found in flight tests that the radially inward flow of air provides the major portion of the lift since the direct downward thrust of the impeller 16 is insufficient to support the aircraft alone. The true airfoil of the wing 10 being the actual radial cross section thereof, the radial airflow thus being in the necessary direction to derive maximum lift. For vertical and hovering flight or low speed lateral flight, the radial airflow is assisted by ejecting pressurized air from the apertures 38, so initiating in airflow inwardly over the upper surface 30 from the periphery 22. This induced flow ensures that the airflow is effective over the maximum possible wing surface.

Figure 6:
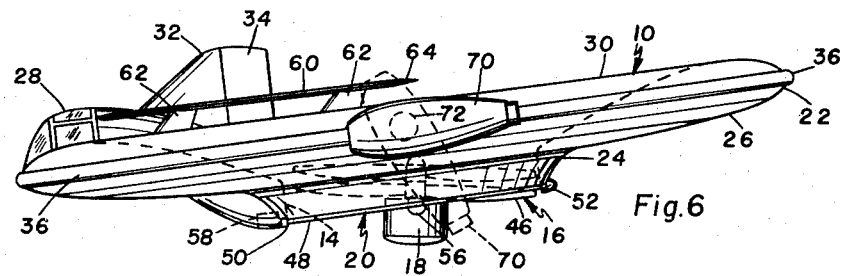
Fig. 6 is a side elevation view thereof in exaggerated forward flight attitude.

To move the aircraft laterally in low speed flight, the impeller 16 is tilted by means of the motors 56 or 58. For example, to move the aircraft forward, the motors 56 are operated to tilt the impeller 16 as shown in Fig. 6. Flight tests have shown, however, that the impeller 16 tends to remain in its normal plane of rotation, due to gyroscopic effect of the propellers 46, while the aircraft actually tilts. This tilting of the aircraft causes the angle of attack of the airfoil to be increased on one side and decreased on the other, so increasing the lift on one side of the aircraft. The uneven lift thus causes the aircraft to move toward the side of decreased lift and the aircraft normally assumes a slight downward tilt in the direction of motion. To counteract undue tilting and exaggerated flight attitudes, the elevons 64 are used to deflect portions of the airflow to achieve the desired effect. Both elevons can be actuated in the same direction in the manner of elevators to raise or lower the nose of the aircraft, or may be used in the manner of ailerons to control lateral tilt. The function and operation of the elevons 64 are familiar to those versed in the art. By tilting the impeller 16 in the correct direction the aircraft may be made to fly in any horizontal direction and, by controlling the impeller speed in combination therewith, can be made to rise or fall in the chosen direction.

For forward flight at higher speeds the jet engines 70 are used. Since in high speed flight the airflow is generally from front to rear across the entire wing 10, the compressor 40 can be turned off, the induction airflow being ineffective under such conditions. While the radial airfoil section of the wing is less efficient in forward flight, the large total area of the wing 10 compensates for any loss of lift and, if necessary, the jet engines 70 can be tilted slightly to provide a lift component. This may be particularly advantageous under heavy load conditions. In forward flight the elevons 64 provide directional control together with the rudder 34. It should be noted that the rudder 34 is situated at the forward end of the aircraft so as to be effective in hovering flight as well as in forward flight. If the rudder were in the usual position at the rear of the aircraft, the reversed airflow in that area during vertical or slow speed flight would cause reversal of the normal rudder actions and result in confusion to the pilot.

The aircraft may be operated from confined areas due to its ability to take off and land vertically and its extreme maneuverability at low speeds. While no fuselage is shown, the large circular wing provides considerable internal space for cargo and additional cargo containers can be added beneath the wing if needed. The aircraft is, of course, constructed according to accepted aircraft standards.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

1. In an aircraft: a circular wing comprising the principal aerodynamic lifting surface of the aircraft and having a central circular opening; the radial cross section of said wing between said opening and the outer periphery of the wing being that of lift-producing airfoil having a reduced thickness adjacent said opening and an increased thickness at points remote from said opening and having its leading edge at the outer periphery; an impeller operatively mounted in said opening and constituting means for directing a rapid flow of air radially inwardly over the upper surface of said wing from the outer periphery thereof, whereby lift is created; said impeller driving the air downwardly through said opening to supplement said lift; and said leading edge constituting substantially the entire outer periphery of the aircraft.

2. In an aircraft: a circular wing having a central circular opening; the radial cross section of said wing between said opening and the outer periphery of the wing being that of lift-producing airfoil having a reduced thickness adjacent said opening and an increased thickness at points remote from said opening and having its leading edge at the outer periphery; a duct extending downwardly from said opening; a downwardly thrusting impeller operatively mounted in said duct; and constituting means for directing a flow of air radially inwardly over the upper surface of said wing from the outer periphery thereof, whereby lift is created by said wing; and means for controllably tilting the impeller relative to said wing, whereby the lift of one portion of the wing is altered with reference to the simultaneous lift on another portion of the wing and thus providing for maneuverability of the aircraft.

3. In an aircraft: a circular wing having a central circular opening; the radial cross section of said wing between said opening and the outer periphery of the wing being that of lift-producing airfoil having a reduced thickness adjacent said opening and an increased thickness at points remote from said opening and having its leading edge at the outer periphery; a duct extending downwardly from said opening; a downwardly thrusting impeller operatively mounted in said duct and constituting means for directing a flow whereby lift is created by said wing; and means for controllably tilting the impeller relative to said wing, whereby the lift of one portion of the wing is altered with reference to the simultaneous lift on another portion of the wing and thus providing for maneuverability of the aircraft a tubular ring surrounding the outer periphery of said wing; a source of compressed air communicating with said ring; said ring having a plurality of apertures disposed to direct a flow of air therefrom radially inwardly over the upper surface of said wing.

4. In an aircraft: a circular wing having a central circular opening; the radial cross section of said wing between said opening and the outer periphery of the wing being that of lift-producing airfoil having a reduced thickness adjacent said opening and an increased thickness at points remote from said opening and having its leading edge at the outer periphery; a duct extending downwardly from said opening; a downwardly thrusting impeller operatively mounted in said duct and constituting means for directing a flow whereby lift is created by said wing; and means for controllably tilting the impeller relative to said wing, whereby the lift of one portion of the wing is altered with reference to the simultaneous lift on another portion of the wing and thus providing for maneuverability of the aircraft a tubular ring surrounding the outer periphery of said wing; a source of compressed air communicating with said ring; said ring having a plurality of apertures disposed to direct a flow of air therefrom radially inwardly over the upper surface of said wing; and control planes spaced above said wing; portions of said control planes being movable to deflect portions of the airflow over said wing for further altering the lift of one portion of the wing relative to another portion of the wing and further promoting maneuverability.

5. In an aircraft: a circular wing having a central circular opening; the radial cross section of said wing between said opening and the outer periphery of the wing being substantially a true airfoil having its leading edge at the outer periphery; a duct extending downwardly from said opening; a downwardly thrusting impeller operatively mounted in said duct; means for controllably tilting said impeller in two directions normal to each other; a tubular ring surrounding the outer periphery of said wing; a source of compressed air communicating with said ring; and a plurality of apertures in said ring disposed to direct a flow of air therefrom radially inwardly over the upper surface of said wing; a pair of opposed control planes fixed above said wing; said control planes extending outwardly and rearwardly from the longitudinal axis of the aircraft forwardly of said opening; portions of said control planes being movable to deflect portions of the airflow over said wing.

6. In an aircraft: a circular wing having a central circular opening; the radial cross section of said wing between said opening and the outer periphery of the wing being substantially a true airfoil having its leading edge at the outer periphery; a duct extending downwardly from said opening; a downwardly thrusting impeller operatively mounted in said duct; means for controllably tilting said impeller in two directions normal to each other; a tubular ring surrounding the outer periphery of said wing; a source of compressed air communicating with said ring; and a plurality of apertures in said ring disposed to direct a flow of air therefrom radially inwardly over the upper surface of said wing; a cabin on the forward portion of said wing; an upright fin extending from said cabin; a rudder pivotally mounted on said fin forwardly of said opening; a pair of control planes fixed above said wing; said control planes extending outwardly and rearwardly from said cabin on opposite sides thereof; portions of said control planes being selectively movable to deflect portions of the airflow over said wing.

7. In an aircraft: a circular wing having a central circular opening; the radial cross section of said wing between said opening and the outer periphery of the wing being substantially a true airfoil having its leading edge at the outer periphery; a duct extending downwardly from said opening; a downwardly thrusting impeller operatively mounted in said duct; said impeller being mounted in a gimbal for pivotal movement about an axis parallel to the longitudinal axis of the aircraft and about a second axis normal to said first axis; and means for tilting said impeller about said axes selectively; a tubular ring surrounding the outer periphery of said wing; a source of compressed air communicating with said ring; and a plurality of apertures in said ring disposed to direct a flow of air therefrom radially inwardly over the upper surface of said wing; a cabin on the forward portion of said wing; an upright fin extending from said cabin; a rudder pivotally mounted on said fin forwardly of said opening; a pair of control planes fixed above said wing; said control planes extending outwardly and rearwardly from said cabin on opposite sides thereof; portions of said control planes being selectively movable to deflect portions of the airflow over said wing.

8. In an aircraft: a circular wing having a central circular opening; the radial cross section of said wing between said opening and the outer periphery of the wing being substantially a true airfoil having its leading edge at the outer periphery; a duct extending downwardly from said opening; a downwardly thrusting impeller operatively mounted in said duct; said impeller being mounted in a gimbal for pivotal movement about an axis parallel to the longitudinal axis of the aircraft and about a second axis normal to said first axis; and means for tilting said impeller about said axes selectively; a tubular ring surrounding the outer periphery of said wing; a source of compressed air communicating with said ring; and a plurality of apertures in said ring disposed to direct a flow of air therefrom radially inwardly over the upper surface of said wing; a cabin on the forward portion of said wing; an upright fin extending from said cabin; a rudder pivotally mounted on said fin forwardly of said opening; a pair of control planes fixed above said wing; said control planes extending outwardly and rearwardly from said cabin on opposite sides thereof; portions of said control planes being selectively movable to deflect portions of the airflow over said wing; and generally rearwardly thrusting propulsion means operatively mounted on said wing.

References Cited in the file of this patent

UNITED STATES PATENTS

| | | |
|---|---|---|
| 1,822,386 | Andersen | Sept. 8, 1931 |
| 2,711,295 | Peterson | June 21, 1955 |
| 2,718,364 | Crabtree | Sept. 20, 1955 |

FOREIGN PATENTS

| | | |
|---|---|---|
| 129,142 | Great Britain | July 10, 1919 |
| 339,462 | Italy | Apr. 22, 1936 |
| 425,617 | France | Apr. 8, 1911 |
| 459,629 | France | Sept. 10, 1913 |